(12) United States Patent
Peterson

(10) Patent No.: US 7,403,100 B2
(45) Date of Patent: Jul. 22, 2008

(54) DETECTION OF TRAILER PRESENCE AND TYPE BY MEANS OF CURRENT DETECTION

(75) Inventor: Christer Peterson, Gråbo (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 10/709,408

(22) Filed: May 3, 2004

(65) Prior Publication Data

US 2005/0017856 A1    Jan. 27, 2005

Related U.S. Application Data

(60) Provisional application No. 60/467,145, filed on May 2, 2003.

(51) Int. Cl.
*G08B 21/00* (2006.01)

(52) U.S. Cl. .................. 340/431; 340/538; 340/310.11; 324/504; 375/257

(58) Field of Classification Search .................. 340/431, 340/538, 310.11; 280/422; 307/9.1; 303/7; 701/1, 29, 36; 324/504, 508, 609; 375/257, 375/258

See application file for complete search history.

(56) References Cited

U.S. PATENT DOCUMENTS 5,604,429 A * 2/1997 Nakashima ................. 323/349
5,739,592 A * 4/1998 Rigsby et al. ................ 307/9.1
5,805,061 A * 9/1998 Fritz et al. ................... 340/471
6,130,487 A * 10/2000 Bertalan et al. .............. 307/9.1
6,466,028 B1 * 10/2002 Coppinger et al. .......... 324/504
6,837,551 B2 * 1/2005 Robinson et al. .............. 303/7

* cited by examiner

*Primary Examiner*—Davetta W. Goins
(74) *Attorney, Agent, or Firm*—Novak Druce + Quigg LLP

(57) ABSTRACT

Method and device for detecting the presence and type of trailer which may have been connected to a vehicle including arrangements for applying a first voltage to a first amount of power lines for a first sub system in the trailer and arrangements for measuring the individual currents consumed by components in the first sub system. An arrangement is also included for comparing the individual currents to a first predefined threshold. The device additionally has arrangements for applying a second voltage to a second amount of power lines in the first sub system in the trailer and an arrangement for measuring the total current in the second amount of power lines, together with an arrangement for comparing the total current in the second amount of power lines to a second threshold. An arrangement for making decisions is provided and adapted to decide which kind of trailer, if any, is connected to the towing vehicle based on the measured currents.

11 Claims, 4 Drawing Sheets

DETECTION OF TRAILER PRESENCE AND TYPE BY MEANS OF CURRENT DETECTION

CROSS-REFERENCE TO RELATED APPLICATIONS

The present application claims the benefit of U.S. Provisional Application No. 60/467,145 filed 2 May 2003. Said application is expressly incorporated herein by reference in its entirety.

TECHNICAL FIELD

The present invention relates to a device for detecting the presence and type of a trailer which may be connected to a vehicle, and also to a method for carrying out such detection.

By means of the invention, trailers with different types of sub systems, such as for example light systems, can be detected, as well as the total absence of any trailer.

BACKGROUND ART

When connecting a trailer to a vehicle, it is often important for different kinds of systems and components in the vehicle to be aware of the trailer in order to ensure proper operation of the vehicle. This is true for such systems as, for example, automatic gear boxes, brake systems and light systems all of which may apply different kinds of automated programs depending on the presence or absence of a trailer.

The detection of the presence or absence of a trailer is of particular importance for trucks, and thus for truck drivers, but can also be important for drivers of ordinary vehicles when attaching trailers, campers, caravans and the like.

Conventionally, detecting the absence or presence of a trailer has been carried out by measuring the current going to the light system of the trailer, a current which is conventionally fed via a power line attached to the vehicle. Since conventional trailers have lamps of the traditional design, the current consumed by the light system of the trailer has typically been quite high. This normally made it easy to detect the presence or absence of a trailer by measuring the current at an outlet of the vehicle to a power line to a trailer, and comparing the level of that current to a known threshold. In addition, since such currents are so high, it has been possible to carry out the measurement by means of components which have rather poor resolution, making the components and also the measurement inexpensive.

Recently, however, vehicles and trailers have begun using lights equipped with Light Emitting Diodes, or LED:s. One property of such diodes is that they consume a minimal amount of power compared to conventional lights. This is advantageous in many ways, but it makes the detection as explained above difficult or impossible since the amount of power consumed by a trailer equipped with LED-lights involves currents which will not be above the threshold for conventional lights, and might not even be at a level which is even theoretically possible to detect with the kinds of components traditionally utilized.

Thus, if a vehicle has a trailer connected and the trailer is equipped with LED lights, the systems in the vehicle which use information regarding the presence or absence of a trailer will receive erroneous information.

DISCLOSURE OF INVENTION

There is thus, as has been explained above, a need for a device and a method by means of which it is possible to detect the presence of a trailer connected to a vehicle. It is also desirable to be able to detect the type and/or characteristics of such a connected trailer thereby permitting adaptations by the towing vehicle.

This need is addressed by the present invention in that it comprises (includes, but is not limited to) means for applying a first voltage to a first amount of power lines for a first sub system in the trailer and means for measuring the individual currents consumed by components in the first sub system, including means for comparing the level of the individual currents to a first predefined threshold.

In addition, the device comprises means for applying a second voltage to a second amount of power lines in the first sub system in the trailer, and means for measuring the total current in the second amount of power lines.

The device also comprises means for comparing the total current in the second amount of power lines to a second threshold, and decision making means adapted to decide which kind of trailer, if any, is connected to the vehicle based on the measured currents.

Thus, by means of the invention, a device is disclosed which can detect the attachment of a trailer to a vehicle regardless of the type of lights with which the trailer is equipped. This is due to the fact that the device can first detect the current in one of the power lines; i.e., the current to one of the lights. If the lights are of the conventional type, the level of the current will be sufficient to enable detection in the conventional way.

If no trailer is detected in the conventional way, a device configured according to the prenet invention will apply a voltage to a group (the second amount) to measure the current going to that group. Since the measurement involves the current to a group of devices such as lights, the currents involved will be sufficiently high to allow a dependable detection.

The voltage applied to the second group can be the same voltage; that is, not just identical in level, but the same pulse as that applied initially to detect conventional lights, or it can be a separate voltage pulse applied after the device has determined/decided that no conventional lights are used.

The invention also discloses a method for using a device configured according to the teachings of the present invention.

BRIEF DESCRIPTION OF THE DRAWINGS

The invention will be described in more detail below, with reference to the appended drawings, in which.

MODE FOR THE INVENTION

Figure 1:
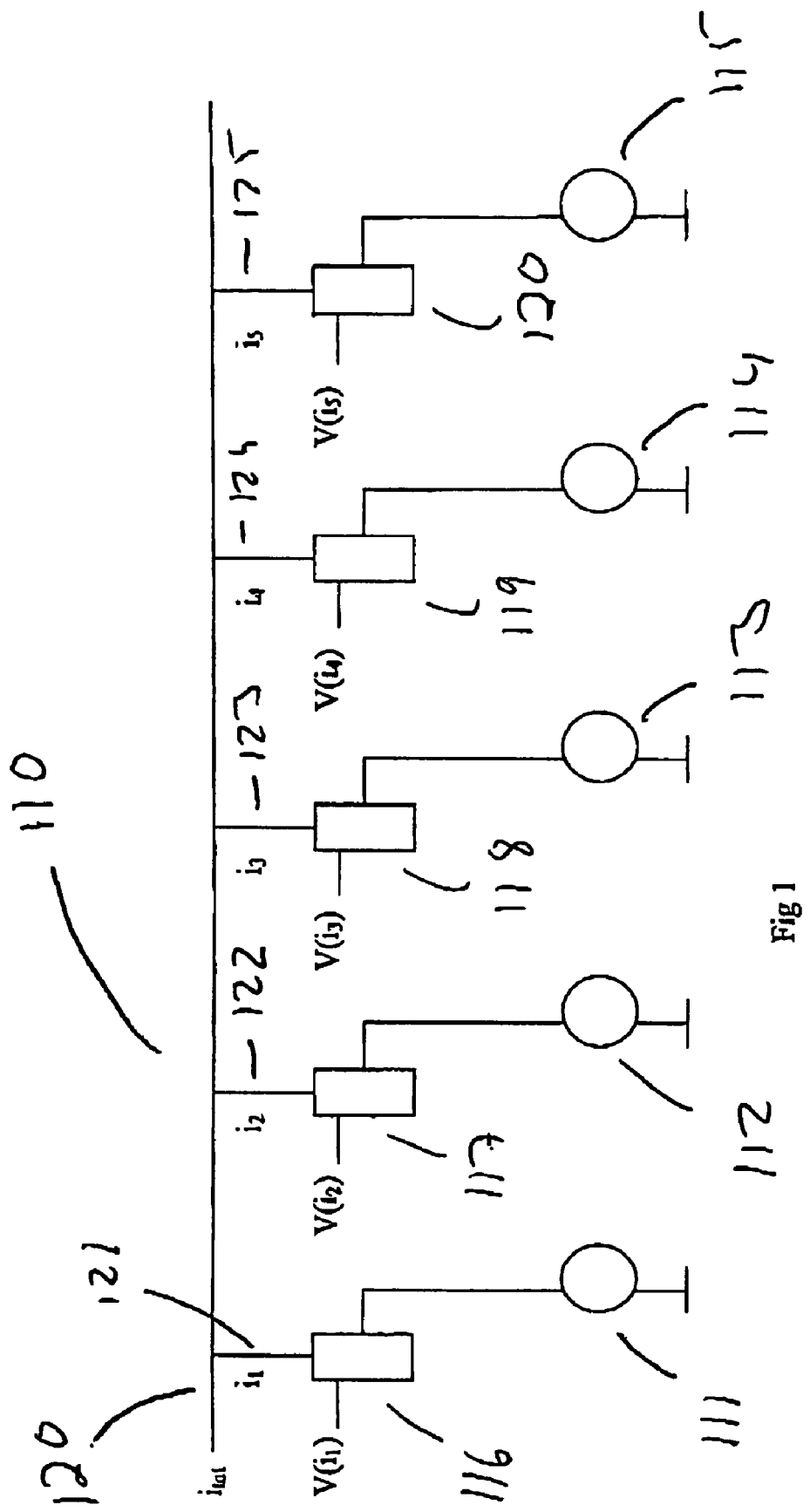
FIG. 1 illustrates a previously known system.

FIG. 1 shows an arrangement configured according to the previously known teachings in which a trailer is attached to a vehicle, and in order to ensure power supply to a subsystem 110 in the trailer, a power cord 120 from the trailer is attached to a corresponding outlet in the vehicle.

From now on, the subsystem 110 in the trailer will be described as being the light system of the trailer. It should, however, be understood that this is merely for the sake of clarity and ease of understanding; devices and arrangements configured according to the present invention can be applied to essentially any subsystem that uses a power feed from a vehicle to a trailer.

Returning now to FIG. 1, the light system comprises a plurality—in the example shown five—components; i.e., lights, 111-115. The power supply and thus the current, $i_1$-$i_5$, to each light from the main power line is controlled by a control component 116-120, preferably a power FET-transistor. Each of the control components is also equipped with a "measuring port," such as a port or connection possibility where the component applies an output voltage $V_{(i)}$ that is proportional to the current that passes through the control component.

Thus, when there is a need for detecting whether a trailer is attached to a towing vehicle, a control component in the vehicle applies a first voltage to the power cable 120 leading to the trailer, and controls each control component 116-120 to let current flow to the lights 111-115 through individual power lines 121, 122, 123, 124, 125 leading to each individual lamp. Thus, a voltage is applied to a first amount of power lines, the first amount in this example being the total amount of power lines 121-125.

The same, or another control component in the vehicle then measures the mentioned output voltage for each FET 116-120 and can thus get a good and reliable measurement of the current consumed by each of the lights. If the lights are of the conventional type, the currents involved will be rather large, thus making the measurement easy. Typically, the initial current for one conventional light can be as high as 10 A, and in a steady state the current consumption is around 1 A. By detecting if the current consumed by one or more of the lights is above a first predefined threshold limit, the control unit in the vehicle can detect the presence or absence of a trailer. Preferably, but not necessarily, the presence of a current above the threshold is required in at least two lights in order to minimize the risk of errors due to, for example, short circuits or current leakage.

If there is a trailer attached to the vehicle, the application of a test voltage to the lights will turn on the lights, which in turn will cause blinking. In order to minimize this, the test voltage is only applied at certain specified points in time, for example, when the parking brake is released, when the vehicle is started, when the lights are turned on by the driver, or when any combination of these and other specified events occur.

As stated previously, since the power consumed by conventional lights is rather high, the FETs or control components 116-120 can be of an inexpensive type which only allows for measuring rather high current levels due to, for example, the control components having an "offset" current which is typically about 0.5 A. If an attached trailer is equipped with lights of the more modern LED-type, the involved power levels will be lower, thus leading to the detection of an "absence" of a trailer, although a trailer is in fact attached to the vehicle.

Needless to say, the erroneous detection of the "absence" of a trailer will lead to a number of inconveniences and problems for the driver of the vehicle.

Figure 2:
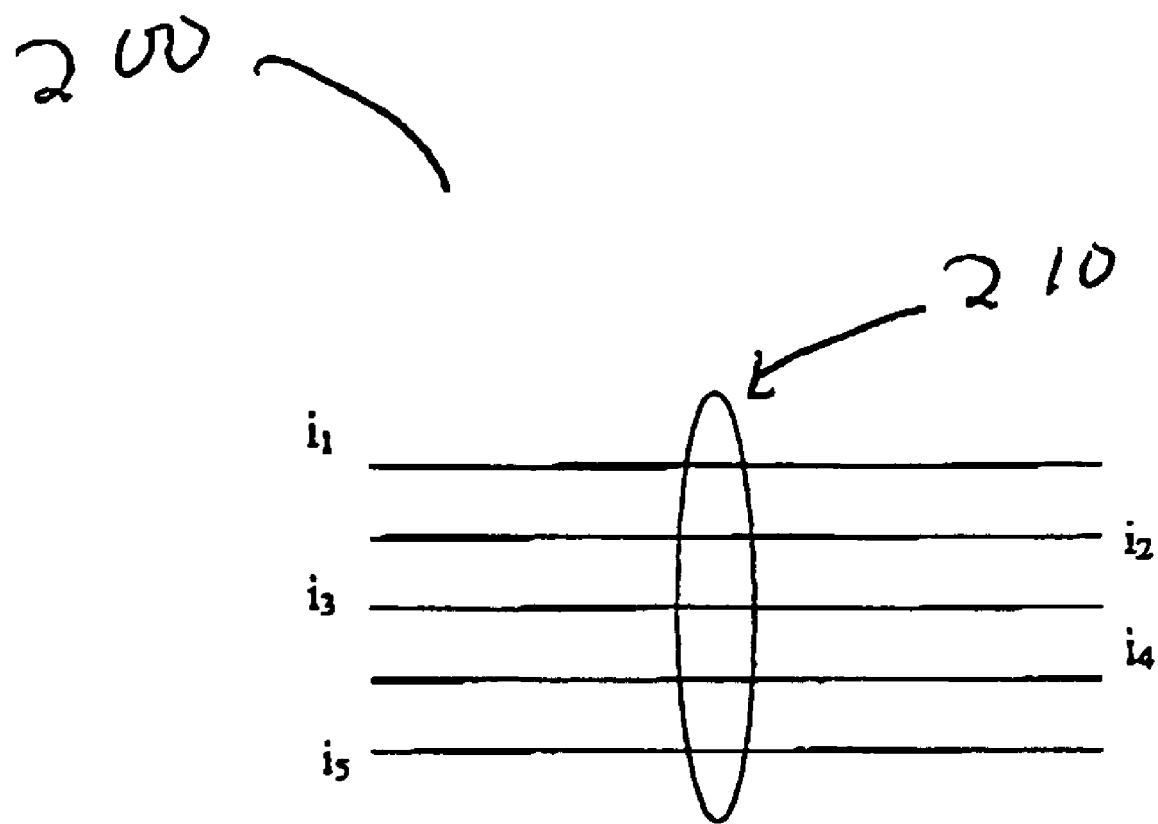
FIG. 2 illustrates one embodiment of a device for carrying out the present invention.

FIG. 2, in a very schematic manner, shows a first embodiment of a device 200 configured according to the present invention. Since the basic problem to be solved by the invention is due to the fact that lights of the LED-type consume less power than conventional lights, one way of enabling detection of the presence of a trailer is by determining power consumption by means of current detection by measuring the total current passing though a plurality of power lines to the different lights when a voltage is applied to the plurality of power lines.

As illustrated in FIG. 2, a device does exactly this: when a voltage, which in the shown embodiment can be the same voltage as that applied to detect lights of a traditional kind, or a separate voltage pulse, is applied to the power line leading to the trailer, the device according to the invention is equipped with a means 210 for measuring the total current in a second amount of power lines, in this case all of the power lines leading to the individual lights 111-115. In connection with the voltage pulse applied, the control means, the FETs, are controlled to allow current to flow to the lights. The means 210, according to this embodiment of the invention, is suitably one which can be fitted to the power system or power lines externally, for example a device that uses the induction principle for measuring current.

The level of the current detected by the detection means is compared to a second threshold, where the second threshold is adapted to levels appropriate for the detection of LED-lights. The outcome of the comparison is used by (not shown) a decision making means in the device of the invention in order to decide which kind of trailer, if any, is attached to the vehicle.

Figure 3:
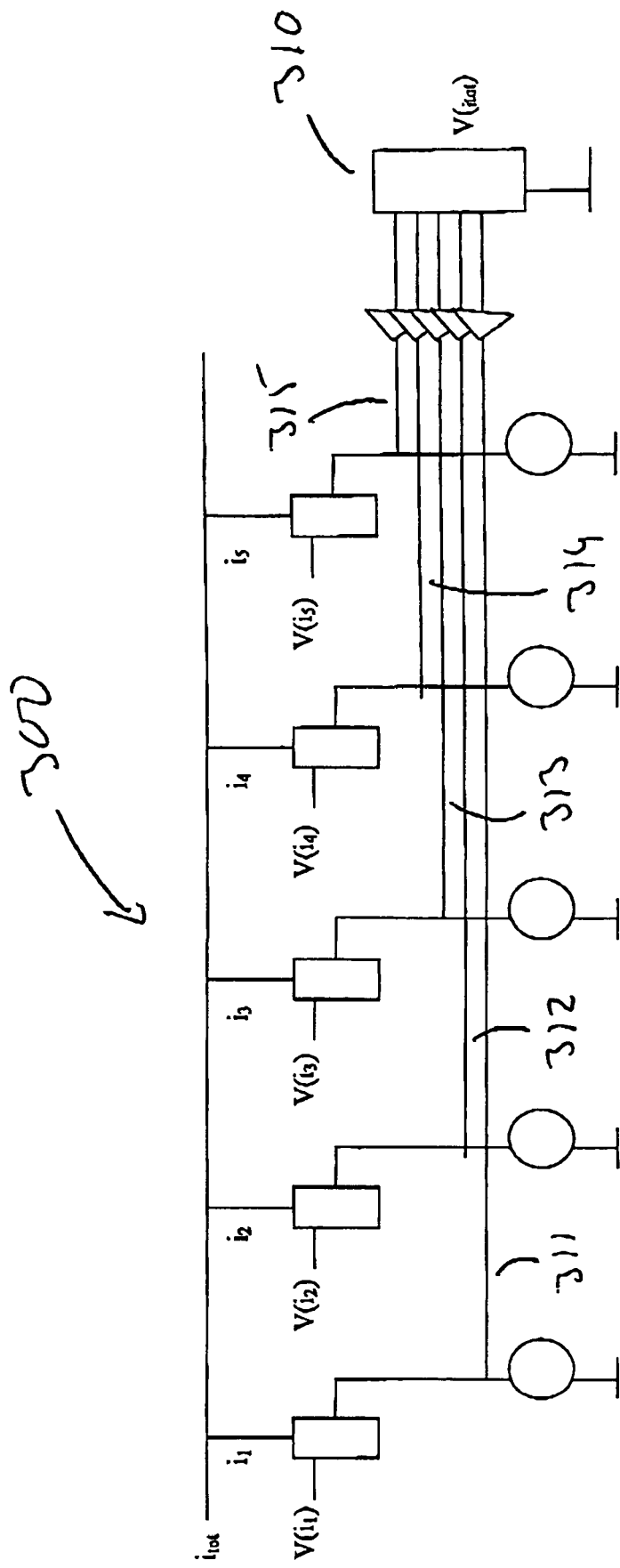
FIG. 3 illustrates another embodiment of the present invention.

In FIG. 3, a second embodiment of a device 300 that is configured according to the invention is shown: this device can be used internally in the power system of the vehicle or the trailer, and comprises separate control means 310, preferably a power FET-transistor, for use as a switch. By means of the switch 310, suitably controlled by a not shown control means, a voltage is applied to separate lines 311-315 from the switch to the individual lights in the system. This is done by individual connections or power lines from the FET to each of the lights in the system; that is, to a second amount of power lines, with each of the connections from the FET 310 to the individual lights suitably comprising a diode. In this embodiment, the second amount equals the total amount of power lines.

In this way, if the detection in the traditional way described above with reference to FIG. 1 does not indicate the presence of a trailer, the control means controlling the FET 310 can apply a second voltage to the FET 310, and control the FET to switch "on" the current to the individual lights. In a similar way as the FET:s described with reference to FIG. 1, the FET or control means 310 comprises a port for an output voltage which is in proportion to the current which passes through the FET 310. It is thus easy to detect the total current passing to the lights from the FET, and it is also easy for a control means to compare this total current to a second threshold, with the second threshold being adapted for the detection of LED-lights.

The control means or FET 310 used in this embodiment for applying the second voltage does not need to be as tolerant of large currents as the other FETs shown in FIG. 1 because the FET 310 need only admit current levels used by the LEDs. This makes the embodiment shown in FIG. 3 inexpensive.

Figure 4:
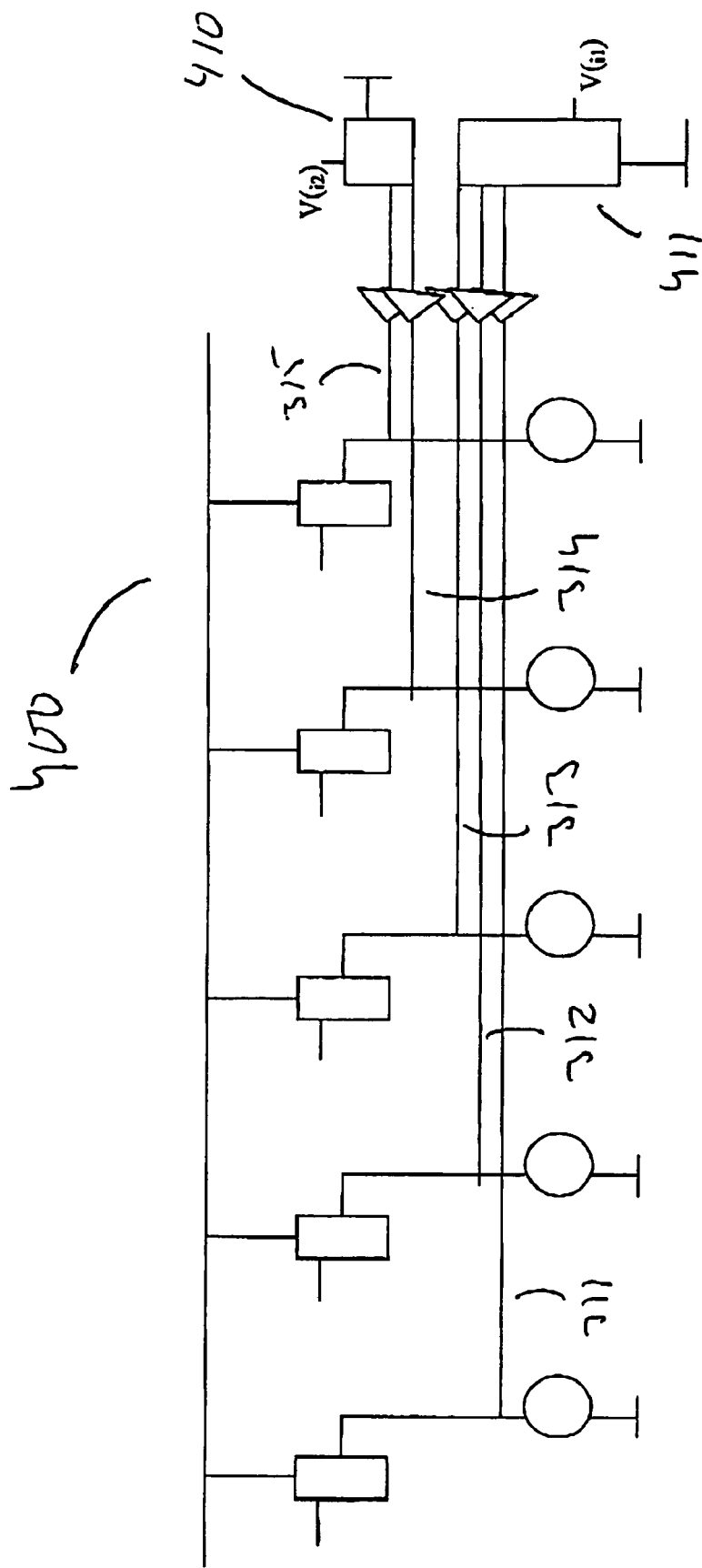
FIG. 4 illustrates still another embodiment of the present invention.

Finally, FIG. 4 shows a third embodiment of a device 400 configured according to the invention: in order to increase the resolution of the detection principle shown in FIG. 3, the device, as taught by the present invention, can be equipped with means 410, 411 for applying the second test voltage to only a group of the components or lights in the presumed trailer. In order to achieve this, the lights can, for example, be arranged into two groups, with the components (lights) in each group having individual power lines. However, the power lines to one and the same group get their power feed from an individual control means 410, 411, for that group, suitably a FET of the same kind used in the embodiment of FIG. 3.

The control means that control the detection can then apply a second voltage to each of the individual FETs if, for example, the first voltage applied does not show the presence of traditional lights, as described in connection to FIG. 1. The embodiment of FIG. 4, however, can increase the cost somewhat compared to that of FIG. 3, but it also gives greatly enhanced resolution and reliability. In addition, the individual control means 410, 411, for the different groups need only withstand smaller amounts of power, thus making it possible to use less expensive components.

Preferably, when choosing how to arrange the lights into different groups as shown in FIG. 4, the grouping is done according to the sensitivity of the components and so that all of the components (lights) which are deemed the most important are not arranged into one and the same group.

Finally, another contemplation of the invention is similar to that illustrated in FIG. 2, but the measurement made on the ground cable from the trailer.

Throughout this text, reference is made to control means and decision making means. This terminology has been chosen due to the fact that the specific nature of such control means and decision making means is of lesser importance to the present invention, and they are well known to those persons skilled in the art.

The invention claimed is:

1. A device for detecting the presence and type of trailer connected to a towing vehicle, said device comprising: means for applying a first voltage to a first amount of power lines for a first sub system in the trailer and a plurality of means for measuring the individual currents consumed by components in said first sub system including means for comparing the level of said individual currents to a first predefined threshold; means for applying a second voltage to a second amount of power lines in the first sub system in the trailer; means for measuring the total current in said second amount of power lines; and decision means for comparing the total current in the second amount of power lines to a second threshold and thereby determining at least one of (1) whether a trailer is present and (2) characteristics of a detected trailer.

2. The device as recited in claim 1, wherein the means for applying the second voltage is only activated when the individual current consumed by the components in the first sub system is below the level of said first predefined threshold.

3. The device as recited in claim 2, wherein the means for applying the second voltage applies said second voltage to each of the individual components in the first sub system.

4. The device as recited in claim 2, wherein the means for applying the second voltage applies said second voltage to at least one group of components in the sub system.

5. The device as recited in claim 1, wherein the application of the first voltage is also used as said second voltage, with the second amount of power lines being the total amount of power lines to the sub system.

6. The device as recited in claim 1, wherein the sub system is used is the light system of the trailer.

7. A method for detecting the presence and type of trailer connected to a towing vehicle, said method comprising: applying a first voltage to a first amount of power lines for a first sub system in the trailer and measuring by a plurality of measuring means the individual currents consumed by components in said first sub system; comparing the level of said individual currents to a first predefined threshold; applying a second voltage to a second amount of power lines in the first sub system in the trailer; measuring the total current in said second amount of power lines; comparing the total current in the second amount of power lines to a second threshold; and determining at least one of (1) whether a trailer is present and (2) characteristics of a detected trailer, said determination being based on said measured currents.

8. The method as recited in claim 7, wherein the second voltage is applied only when the individual current consumed by the components in the first sub system is below the level of said first predefined threshold.

9. The method as recited in claim 8, wherein the second voltage is applied to each of the individual components in the sub system.

10. The method as recited in claim 8, wherein the second voltage is applied to at least one group of components in the sub system.

11. The method as recited in claim 8, wherein the first voltage is also used as said second voltage, with the second amount of power lines being the total amount of power lines to the sub system.

* * * * *